Sept. 17, 1940. A. J. SCHMIDT ET AL Re. 21,573

END LABEL ATTACHMENT

Original Filed Oct. 27, 1937 2 Sheets-Sheet 1

INVENTORS
AUGUST J. SCHMIDT
JOHN JACKSON
BY
ATTORNEY

Sept. 17, 1940. A. J. SCHMIDT ET AL Re. 21,573

END LABEL ATTACHMENT

Original Filed Oct. 27, 1937 2 Sheets-Sheet 2

INVENTORS
AUGUST J. SCHMIDT
BY JOHN JACKSON
George Hastings
ATTORNEY

Reissued Sept. 17, 1940

Re. 21,573

UNITED STATES PATENT OFFICE 21,573

END LABEL ATTACHMENT

August J. Schmidt, Glendale, and John Jackson, Brooklyn, N. Y., assignors to American Machine & Foundry Company, a corporation of New Jersey Original No. 2,201,207, dated May 21, 1940, Serial No. 171,388, October 27, 1937. Renewed August 19, 1939. Application for reissue June 5, 1940, Serial No. 339,002

26 Claims. (Cl. 216—52)

This invention relates to improvements in wrapping or packaging, more particularly to an improved process and end label attachment for applying labels to the ends of packages. The main object of the invention is to secure labels to packages having a plain, waxed or coated paper wrapper, or other coated or uncoated wrapping material.

In the embodiment selected to illustrate the improved attachment, the labels are stacked in magazines from which they are successively withdrawn horizontally by a segment roller and led to rollers of the label feed which feed them into a vertical position. The labels are drawn horizontally from the label feed by a cam actuated revolving gripper which nips the labels and carries them over a roller which applies a coating of adhesive to the labels and then attaches them to the ends of the package. A further object is to permit the adjustment of the label feed to stop the label in different vertical positions to center it with packages of various heights, or to permit the feeding of labels of various sizes into centered relation with the packages.

In wrapping merchandise subject to deterioration unless protected from changes in moisture content, it has been a common practice to encase the packages with a waxed paper wrapper whose seams are fused together by heat sealing means. In the past, ordinary means for attaching labels over a wax paper covering have proven unsuccessful as they fail to produce adhesion, resulting in the labels falling or peeling off the packages when they are handled.

We have found that if the label is coated with an adhesive and rolled on to the folded ends of the package shortly before heat sealing the wrapper ends that the label adhesive will permeate the melted wax coating and adhere to the paper when the ends of the package are subjected to the sealer members. Still another object of the invention is to apply and heat seal glued labels to packages in this manner, and to provide a construction wherein the end label attachment and heaters are simultaneously adjustable to accommodate packages of various lengths. With these and other objects not specifically mentioned in view the invention consists in certain constructions and combinations hereinafter fully described and specifically set forth in the claims hereunto appended.

In the accompanying drawings, which form a part of this specification, and in which like characters of reference indicate the same or like parts:

Figure 1:
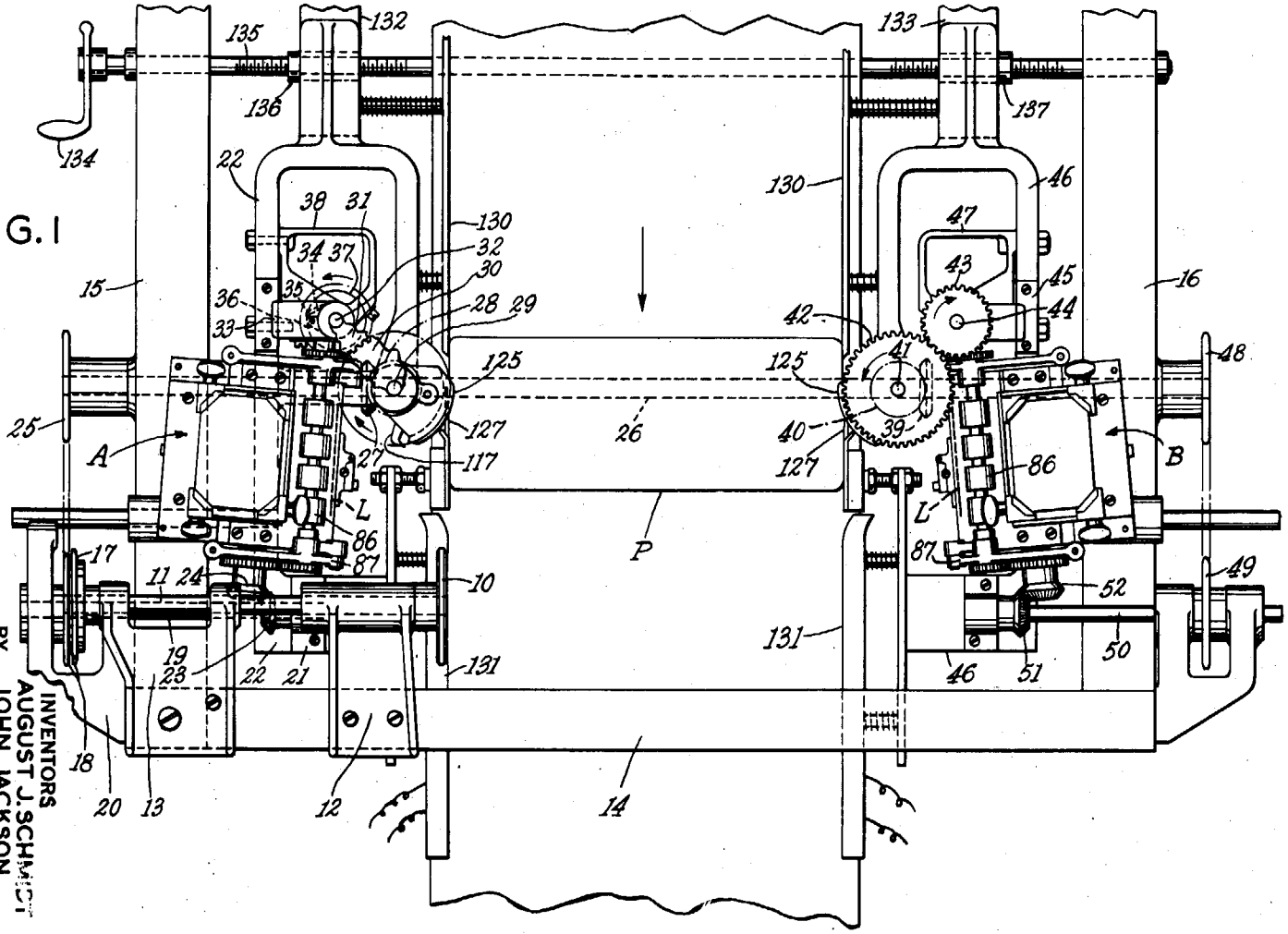
Fig. 1 is a plan view of the end label attachment used in conjunction with a wrapping machine.

In the particular embodiment of the invention selected for illustration in the drawings, the invention is shown in conjunction with a bread wrapping machine of well known construction wherein a sprocket 10 (Fig. 1) is driven by one of the endless conveyor chains (not shown) which are provided with flights serving to propel the packages through the machine. Sprocket 10 is mounted on a shaft 11 supported in bearing brackets 12 and 13 carried by a cross bar 14 attached to the side frames 15 and 16 of the wrapping machine. Over a sprocket 17 mounted on the outer end of shaft 11 is trained a sprocket chain which drives one sprocket of a double sprocket 18 splined on a counter-shaft 19 supported directly below shaft 11 by a bracket 20 attached to frame 15 and a bearing 21 in an adjustable support 22. A bevel gear 23 splined on shaft 19 meshes with bevel gear 24 on the drive shaft of the label attachment indicated generally at A in Fig. 1, and thereby imparts motion to the same.

From the double sprocket 18, by means of a chain trained over the second sprocket thereof is driven a sprocket 25 fastened on the protruding end of cross shaft 26, thus driving a bevel gear 27 meshing with a bevel gear 28 fixed on the vertical shaft 29 of the label attachment A (Fig. 1) which is supported in bearings of the bracket 22, shaft 26 being journaled in the frames 15 and 16. The upper end of shaft 29 is equipped with a gear 30 driving a gear 31 fixed on a stub shaft 32 carried by bracket 33 detachably fastened on support 22. On the lower end of shaft 32 is mounted a dog 34 provided with a vertical pin 35 engaging a horizontal arm 36 which is fastened to the glue roller 37 suitably supported on a vertical axis in bearings of the glue pot 38 and protruding from an opening in the same. It will be seen that dog 34, by means of this connection, drives the roller 37. A bevel gear 39 also mounted on shaft 26 drives a bevel gear 40 mounted on the upright shaft 41 of the label attachment B and imparts motion to a gear 42 meshing with gear 43 fixed on a stub shaft 44 carried by a bracket 45 attached to the other adjustable support (Fig. 1). Gear 43 by means of a dog (not shown) similarly drives a glue roller (not shown) carried by a glue reservoir 47 which is of the same construction as reservoir 38. The construction and arrangement of the glue roller in receptacle 38, and the horizontal arm and dog through which it is driven, is identical with that described in the label attachment A, wherefore illustration of the same is deemed unnecessary. Removal of the brackets 33 and 45 will disengage the dogs from the respective arm of the glue roller and terminate the driving of the same. Thereupon the glue pots 38 and 47 may be unfastened and removed from their respective supports 22 and 46, for cleaning purposes etc. A sprocket 48, on the other protruding end of shaft 26 by means of a chain, drives a sprocket 49 splined on shaft 50 and thereby drives a bevel gear 51 meshing with a bevel gear 52 and imparts motion to the label attachment indicated generally at B.

Figure 2:
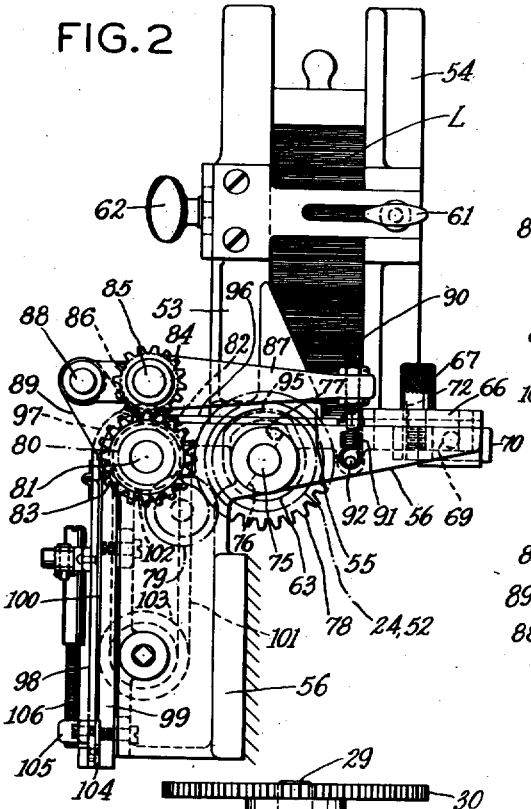
Fig. 2 is a side view of the label magazine and feed.
Figure 3:
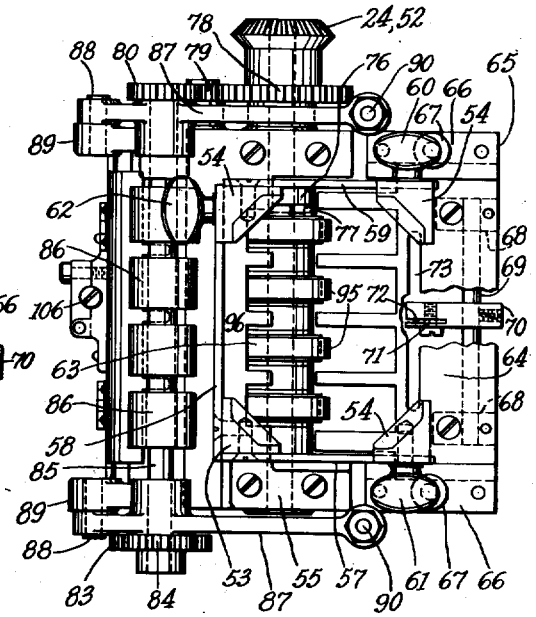
Fig. 3 is a plan view of Fig. 2.

Since the label attachments indicated at A and B are of identical construction and design, it is deemed sufficient to describe the details of but one of the units as illustrated in Figs. 2 and 3. The labels L are stacked in a vertical magazine consisting of upright corner posts 53 and 54, post 53 being provided with a base 55 secured to the bracket 56, attached to one of the adjustable supports. Post 53 supports slotted bars 57 and 58 which at their ends carry posts 54, a slotted bar 59 being fastened to the post on bar 58 to carry the third post 54. In this manner, when thumb screws 60 and 61 are loosened, their respective posts may be adjusted in or out to suit the width of the label, and, by means of a thumb screw 62, the bar 59 and its supported members may be adjusted to suit the length of the label.

The labels L rest on a segmental feed roller 63 and a slotted plate 64 adjustably carried by the end brackets 56 and 65. Each of the said brackets are provided with plates 66 having milled portions engaging and clamped to the ends of plate 64. The plate 64 in this manner may be moved in or out to suit the size of the label and when correctly set it is held in position by clamp screws 67. Plate 64 carries blocks 68 supporting a stud 69 provided with an adjustably mounted arm 70 having a slotted portion 71 in which is clamped a needle or blade 72 adapted to penetrate the lowermost labels and retain said labels in the stack, allowing but one at a time to be withdrawn from the magazine by feed roller 63. Plate 64 is also provided with an elongated slot 73 through which member 72 protrudes, permitting adjustment of the arm 70 into centered relation with respect to the length of the labels.

The bevel gear 24 or 52 of the label attachment A or B respectively, is suitably driven as described above and fastened on the protruding end of shaft 75, a dog 76 fixed on said shaft engaging a pin 77 protruding from roller 63 and driving said roller which is loosely mounted on shaft 75. A spur gear 78 fixed on one end of shaft 75 meshes with an intermediate gear 79 which drives a gear 80 fastened on shaft 81 carrying the lower feed roller 82. The other end of shaft 81 is provided with a gear 83 meshing with a gear 84 fixed on a shaft 85 carrying spaced upper feed rollers 86. Shaft 85 is supported in arms 87 pivoted on studs 88 supported in the projecting lugs 89 of the brackets 56 and 65. Eye-bolts 90 at the end of each arm 87 supports springs 91 which are anchored to posts 92 and tend to hold feed rollers 82 and 86 in contact with each other. Adjustment of eye-bolts 90 will vary the tension of springs 91, thus regulating the pressure of the feed rollers to obtain the best results for feeding the labels.

The roller 63 in revolving brings its high portions 95 successively into contact with the lowermost label in the magazine and withdraws and advances the same over the slotted plate 96 leading to the feed rollers 82 and 86. Since the speed of the feed rollers 82 and 86 is greater than that of the roller 63, when the label is nipped by the feed rollers it pulls the roller 63 along at the same surface speed whereby driving pin 77 is disengaged from its driving dog 76. When the label has advanced sufficiently to terminate its contact with roller 63 the driving dog will overtake and once again engage the pin and drive the said roller the remainder of its cycle. With this arrangement the label being fed cannot be torn or wrinkled and any tendency of disturbing the labels stacked in the magazine is also overcome.

The label after leaving rollers 82 and 86 is guided downward by a curved member 97 hinged to a guide plate 96 which is attached to a backing plate 99 carried by the brackets 56 and 65. A gap 100 between plates 98 and 99 permits the labels to be advanced downward by belts 101 driven by a pulley 102 mounted on shaft 81 and running over an idler pulley 103. The label stops against an adjustable plate 104 which permits centering of the label vertically with respect to the packages. Plate 104 by means of its connection to a threaded lug 105 may be moved up or down by turning the adjusting screw 106, whereby the label may be halted at a higher or lower position to bring it into centered relation with packages of various heights.

Figure 4:
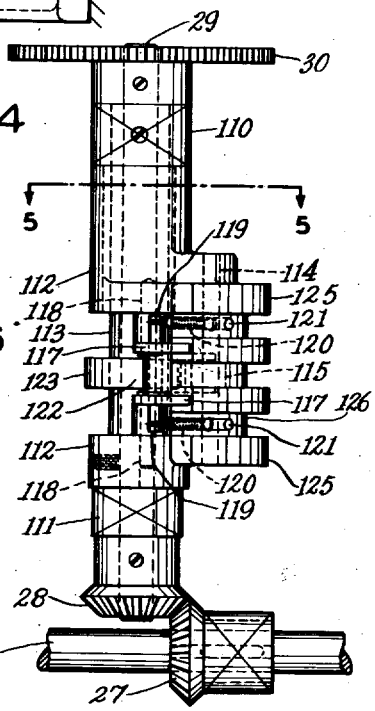
Fig. 4 is a side view of the label gripper unit.
Figure 5:
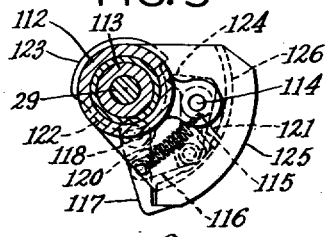
Fig. 5 is a sectional plan view taken from line 5—5 of Fig. 4.

The label is withdrawn edgewise from this latter position by a ripper which will now be described. The upright shaft 29 (Figs. 4 and 5) is supported in bearings 110 and 111 respectively, of the adjustable support 22. The label transfer 112 is secured to the lower end of the shaft 29 by a set screw or the like and revolves upon a stationary sleeve 113 secured in bearing 110. The label transfer 112 is provided with a pintle 114 on one end of which is pivotally mounted a cam lever 115 connected to a link 116 which operates the gripper fingers 117. Fingers 117 are loosely mounted on studs 118 set in the hub of label transfer 112. To the pins 119 in fingers 117 is fastened one end of springs 120 which at their other end are anchored to studs 121 and tend to normally hold the fingers closed (Fig. 5). A cam 122 fixed on sleeve 113 has a raised portion 123 which engages the nose 124 of cam lever 115 and through its connections opens the fingers 117 at the proper time.

The spaced arcuate ribs 125 of the label transfer 112 engage and support the gripped label during its travel over the glue roller which applies adhesive to the face of the label. Into the grooves 126 between the ribs 125 project the label stripper fingers 127, which may have the form of resilient leaf springs, as shown in Fig. 1, and are adjustably mounted.

Figure 6:
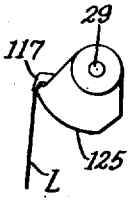
Fig. 6 is a detailed view showing the end of the label nipped by the gripper.
Figure 7:
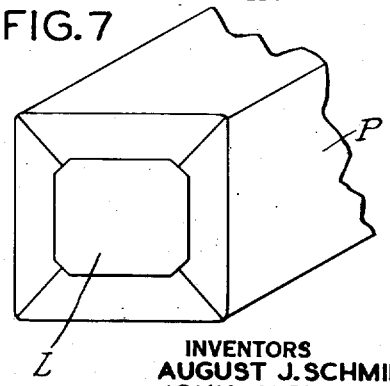
Fig. 7 is a perspective view showing the label attached to one end of the package.

The package P (Fig. 1) is being propelled through the runway of the machine, has its projecting wrapper ends folded by suitable folder plates 130 located at each end of the package. The label transfers 112 in revolving permit the cam 122 to open the gripper fingers 117 and hold them open until they arrive in position to nip the labels L. At this point the nose 124 of cam lever 115 rides off the high portion of cam 122, permitting springs 120 to close the fingers 117 on one upright edge of the labels L as shown in Fig. 6. The labels are then transported over rollers 37 which apply a coating of adhesive, and the continued travel of the label brings it into engagement with the ends of the moving package. When the leading ends of the label L have been applied to the package the fingers 117 are opened, thus releasing the labels. The remaining portion of the labels are then rolled on to the ends of the package by the ribs 125, and the continued movement of the same carries them past suitable heated sealing members 131 which fuse together the folded flaps of the folded wrapper ends. The wrapper on being heated permits the adhesive applied to the label to permeate its softened wax coating and adhere to the underlying paper. The finished package P has the appearance shown in Fig. 7.

The supports 22 and 46 which carry the label attachments are mounted on bars 132 and 133, respectively, of the machine, whereon the folder plates 130 are yieldingly mounted. These bars may be adjusted in or out, to accommodate the length of the packages, by manipulating a handwheel 134 which turns a spindle 135 provided with oppositely threaded portions engaging in threaded hubs 136 and 137 of bars 132 and 133 respectively.

If desired, waxed labels may be used and the glueing operation dispensed with. In this case the stripper fingers will hold the labels on the package ends until they reach the sealer members 131 and are thereby heat sealed thereon.

It will be seen that various sizes of labels within the range of adjustment of the label magazines may be applied to the package ends in properly centered relation, vertically and transversely thereon. By relatively turning or adjusting the sprockets of the double sprocket 18 the motion of the label transfer 112 may be advanced or retarded relative to the motion of the packages to cause labels of various sizes to be applied to their ends in properly centered relation transversely thereof. For this purpose the sprockets of the double sprocket 18 are bolted together, wherefore they may be unbolted and turned relatively to each other to obtain the desired transverse centering of the label. The vertical centering is achieved by the appropriate adjustment of the stop plate 104.

A variety of other kinds of coated materials may be used for the labels such as Cellophane having a fusible coating or gummed paper. In the case of Cellophane and other fusible coated labels, the same may be applied to the packages like the waxed labels without glueing thereof. When using gummed labels, the reservoir 38 may be filled with water and the gummed face thereof moistened by being drawn over the roller 37.

To permit the grippers 117 to be centered with respect to the label in the various positions in which it may be halted by the adjustment of stop 104, the space between the bearings 110 and 111 of the shaft 29 may be sufficient to allow axial adjustment of the label transfer 112 thereon. Upon unloosening the set screw securing it to the shaft 29 the label transfer may be shifted to the desired position. Moreover the shaft 29 may be provided with movable thrust collars (not shown) in the spaces between the label transfer and the bearings 110 and 111. It may be noted that the forward edge of the ribs 125 against which the label is held by the grippers 117, is sufficiently beveled to stop the grippers inside the periphery of the ribs in the various positions of the label transfer to avoid interference with the roller 37.

What is claimed is:

1. The combination with means for advancing packages at constant speed, of mechanism for coating labels with adhesive and applying them to the ends of the advancing package with their adhesive-coated faces in contact with the same, and heaters arranged to engage the labeled package ends, said mechanism being adjustable to apply labels of various sizes in properly centered relation, vertically, to the package ends and including a device for advancing or retarding the label-applying operation relative to the advancing movement of the packages to apply the labels in centered relation transversely of the package ends.

2. The combination with means for advancing wrapped packages at a constant speed, the package wrappers having a fusible wax coating, of mechanism for applying waxed labels to the ends of the packages, heaters arranged to fuse said coating beneath the labels on the package ends to permit the adhesive on the labels to permeate the fused coating and bond the label to the wrapper, said mechanism being adjustable to apply labels of various sizes in properly centered relation vertically to the package ends and including a device for advancing or retarding the label-applying operation relative to the advancing movement of the packages to apply the labels in centered relation transversely of the package ends.

3. The combination with mechanism for coating labels with adhesive and applying them to the ends of packages, with their adhesive-coated faces in contact with the package ends, of heaters arranged to engage the labeled package ends and bond the labels thereto, said mechanism including devices for removing labels from the bottom of a stack wherein the labels are horizontally disposed, and moving them into a vertical position, means for gripping an upright edge of and carrying the labels horizontally into engagement with the ends of the package, and members for applying adhesive to one face of said labels while they are in transit, said devices being adjustable to halt the labels in various vertical positions which will cause them to be applied to the packages in vertically centered relation with respect to the ends thereof.

4. The combination with mechanism for coating labels with adhesive and applying them to the ends of advancing packages with their adhesive-coated faces in contact with the package ends, of heaters arranged to engage the labeled package ends and bond the label to the wrapper, said mechanism including spaced units for glueing and applying labels to the ends of the packages, said mechanism being adjustable to apply labels of various sizes to the package ends in properly centered relation vertically and transversely thereof and including a device for advancing or retarding the label-applying operation relative to the advancing movement of the packages, and means for adjusting said units towards and away from each other to accommodate packages of various lengths.

5. The combination with spaced devices for coating labels with adhesive and applying them to the ends of packages with their adhesive-coated faces in contact with the package ends, of heaters arranged to engage the labeled packaged ends and bond the labels thereto, and means for simultaneously adjusting said devices and heaters toward and away from each other to accommodate packages of various lengths.

6. A label applying mechanism comprising a device for removing labels from the bottom of a stack wherein they are horizontally disposed and moving them into a vertical position, members for applying adhesive to the label while it is in transit, and means for gripping an upright edge of and carrying the adhesive-coated label horizontally into engagement with the end of a package.

7. A label applying mechanism comprising a device for providing labels in a vertical position, members for applying adhesive to the label while it is in transit, means for gripping an upright edge of and carrying the adhesive-coated label horizontally into engagement with the end of a package, said device including an adjustable stop for halting the label delivered by said means in a position which will be in vertically centered relation with packages of various heights.

8. The combination with vertical members arranged to support a label in upright position, of an adjustable stop for maintaining the label supported by said members in centered relation with packages of various heights, a label feed for feeding an individual label into an upright position on said stop, and means for gripping an upright edge of said label and carrying it horizontally into engagement with the end of the package.

9. A process comprising coating one face of labels with adhesive, applying the adhesive-coated faces of the labels to packages having wrappers provided with an external fusible coating, and then heating the labeled portions of the packages while said adhesive is tacky to fuse the coating of the wrapper therebelow and permit the adhesive on the label to permeate the same and bond the label to the wrapper.

10. A process comprising coating one face of labels with adhesive and applying the adhesive-coated faces of the labels with a rolling contact to the ends of advancing packages having wrappers provided with an external fusible coating, and then heating the labeled package ends while said adhesive is tacky to fuse the coating of the wrapper beneath the labels to permit the adhesive to permeate the same and bond the label to the wrapper.

11. A label applying mechanism comprising means for transporting a label and applying it to the end of a package, a detachable adhesive reservoir, a revolving paste roller disposed within said reservoir and arranged to apply adhesive to a label transported by said means, and driving mechanism for said roller including an arm carried by said roller, and a revolubly mounted driving dog engaging said arm.

12. A label applying mechanism comprising a friction roller arranged to remove labels from the bottom of a stack wherein they are horizontally disposed by friction contact therewith, means for driving said roller including a driving member and an independently movable driven member, and feed rollers coacting to nip a label removed from the stack by said friction roller and advance the same at a greater speed, whereby the friction roller will revolve at the speed of the feed rollers and thereby avoid imposing a sudden jerk on the label.

13. The combination with devices for applying coated labels to the ends of advancing packages, of heaters arranged to engage and heat seal the labels to the ends of the packages, said devices including members arranged to initially engage the leading edges of the labels while they are being applied to the package ends and hold the labels on the package ends until they contact said heaters.

14. The combination with devices for applying coated labels to the ends of advancing packages, of heaters arranged to engage and heat seal the labels to the ends of the packages, said devices including members for holding the labels on the package ends until they contact said heaters, and means for simultaneously adjusting said devices and heaters to accommodate packages of various lengths.

15. A label applying mechanism comprising a magazine having an upright immovable corner post and three other upright corner posts adjustable relatively to said immovable post to accommodate horizontally disposed labels of various sizes, means for removing the labels from the bottom of said magazine and advancing them into a vertical position, and a label transfer revolving on an immovable upright axis adjacent said immovable corner post and adapted to grip an upright edge of the vertically positioned labels and carry them into contact with the ends of packages.

16. A process comprising moistening the gummed faces of gummed labels, applying them to the ends of a package having a wrapper provided with an external fusible coating, with their moistened faces in contact with the package ends, and heating the labeled package ends to bond the labels to the wrapper.

17. A label applying mechanism comprising an adjustable stop for maintaining upright labels of various sizes in vertically centered relation with the end of a package, members coacting to supply an upright label on said stop, and a device for gripping one upright edge of a label supported on said stop and applying it to the end of a package, said device being vertically adjustable into centered relation with the label supported on said stop.

18. The combination with a series of spaced traveling members each adapted to advance transversely packages of various widths, of mechanism for applying labels to the ends of the packages advanced by said members, said mechanism being adjustable to advance or retard the operation of said mechanism relative to the movement of said members to apply labels to the ends of packages of various widths in properly centered relation transversely thereof without varying the timing of the operation of said members.

19. The combination with means for advancing packages enfolded in wrappers having tubular projecting portions at the package ends, of spaced folders for folding said tubular portions down on the ends of the packages advanced by said means, spaced devices for applying coated labels to each folded end of said packages, and spaced heaters arranged to engage the labeled ends of the packages to heat seal the labels to the folded wrapper ends, said devices including members arranged to engage and press against the package ends the leading ends of the labels while they are being applied thereto.

20. The combination with means for advancing packages enfolded in wrappers having tubular projecting portions at the package ends, of spaced folders for folding said tubular portions down on the ends of the packages advanced by said means, spaced devices for applying coated labels to each folded end of said packages, and spaced heaters arranged to engage the labeled ends of the packages to heat seal the labels to the folded wrapper ends, and adjusting mechanism for simultaneously moving said folders, devices and heaters equally and oppositely toward and away from each other to accommodate packages of various lengths.

21. The combination with means for advancing packages having end folds, of spaced devices for applying coated labels to said end folds, means for rendering the contacting surfaces of the end folds and labels adherent relatively to the other during the application of the labels, said devices including members arranged to engage and press the labels against the package ends while they are being applied, and means for heat sealing the applied labels to the package ends.

22. The combination with means for advancing packages having end folds, of spaced devices for applying coated labels to said end folds, means for rendering the contacting surfaces of the end folds and labels adherent relatively to the other during the application of the labels, spaced devices for applying the coated labels to each folded end of the packages, and heat sealing means operating on the labeled package ends subsequent to the application of the labels to the end folds to complete the labeling operation.

23. The combination with means for advancing packages having end folds, of spaced devices for applying labels to said end folds, said devices including means for bringing a label into registered position adjacent the ends of the package and a device for pressing at least a portion of the label against said package end, said device being relatively immovable with respect to the path of forward travel of the loaf and operating to press the label while still within the range of operation of said means against said end folds of the advancing package, means for rendering the end folds and label adherent one with respect to the other, and heat sealing means operating on the label subsequent to the application of the label to the end folds to complete the labeling operation.

24. The combination with means for advancing transversely packages of various widths, of mechanism for applying labels to the ends of the packages advanced by said means, said mechanism being adjustable to advance or retard the operation of said mechanism relative to the movement of said means to apply labels to the ends of packages of various widths in properly centered relation transversely thereof without varying the timing of the operation of said means.

25. The combination with mechanism for advancing packages, having end folds, of spaced devices for applying labels to said end folds, said devices including means for bringing labels into registered position adjacent the ends of the package, members for pressing at least a portion of the labels against said package ends, said members being relatively immovable in directions parallel to the path of the package and operating to press the label while still within the range of operation of said means against said end folds of the package while the same is advancing, and means for rendering the end folds and label adherent one with respect to the other.

26. A process comprising advancing packages provided with a wrapper having an external fusible coating and end folds overlying the package ends, applying labels having a dry, thermoplastic, fusible coating to said end folds, and fusing the external coating of said end folds to cause adhesion thereto of the labels when applied thereon.

AUGUST J. SCHMIDT.
JOHN JACKSON.